united states Patent [19]
Meitzler et al.

[11] Patent Number: 6,081,753
[45] Date of Patent: Jun. 27, 2000

[54] METHOD OF DETERMINING PROBABILITY OF TARGET DETECTION IN A VISUALLY CLUTTERED SCENE

[75] Inventors: Thomas J. Meitzler, Troy; Harpreet Singh, Detroit, both of Mich.

[73] Assignee: The United States of America as represented by the Secretary of the Army, Washington, D.C.

[21] Appl. No.: 09/006,529

[22] Filed: Jan. 13, 1998

Related U.S. Application Data

[63] Continuation of application No. 08/614,087, Mar. 12, 1996, abandoned.

[51] Int. Cl.[7] .............................. G09K 9/62; G06F 19/00
[52] U.S. Cl. ........................ 700/90; 374/220; 382/103; 382/208
[58] Field of Search ............................. 700/90; 250/330, 250/334; 348/169; 374/45, 210; 382/103, 140, 228

[56] References Cited

U.S. PATENT DOCUMENTS 5,027,413  6/1991  Barnard .................................. 382/103
5,602,760  2/1997  Chacon et al. ......................... 382/103

*Primary Examiner*—William Grant
*Assistant Examiner*—Steven R. Garland
*Attorney, Agent, or Firm*—David L. Kuhn; Peter A. Taucher

[57] ABSTRACT

A method to determine the probability of detection, P(t), of targets within infrared-imaged, pixelated scenes includes dividing the scenes into target blocks and background blocks. A plurality of ΔT metrics are applied to the blocked scenes to derive various ΔT values for each scene. Factor analysis is then used on the various ΔT values to derive a relative ΔT for each scene. The scenes are divided again, into cells of pixels, in accordance with a plurality of clutter metrics. These clutter metrics are used to derive various clutter values for each scene. Factor analysis is used on the various clutter values to derive relative clutter values for each scene. The relative ΔT values and the relative clutter values are used in determining the probabilities of detection of the targets in the scenes. Based on the probabilities of detection, the optimum scene or set of scenes is selected.

9 Claims, 3 Drawing Sheets

METHOD OF DETERMINING PROBABILITY OF TARGET DETECTION IN A VISUALLY CLUTTERED SCENE

This application is a continuation of application Ser. No. 08/614,087 filed on Mar. 12, 1996, now abandoned, entitled "Method of Determining Probability of Target Detection in a Visually Cluttered Scene."

GOVERNMENT USE

The invention described here may be made, used and licensed by or for the U.S. Government for governmental purposes without paying me royalty.

INCORPORATION BY REFERENCE

We incorporate by reference into this application Thomas Meitzler's doctoral thesis entitled, "Modern Approaches to the Computation of the Probability of Detection in Cluttered Environments" submitted to the Graduate school of Wayne State University at Detroit, Mich.

BACKGROUND AND SUMMARY

Our invention relates to the art of detecting ground vehicles by means of infrared sensors and imaging techniques. Perhaps the most important aspect of this art is to particularly identify specific vehicle types in a battlefield environment so that friend can be distinguished from foe. Ground vehicles generally are found in environments having visual clutter, which make the vehicle or other target of interest more difficult to detect. Clutter is defined verbally and mathematically in various ways. One way to define clutter is to equate it with all objects in the scene's background that look similar to the target or detract from the target. Clutter can also be defined as anything in the scene besides the target that competes for the attention of the viewer. One important facet of infrared imaging of vehicles is determining the probability that the vehicle will be detected over time, P(t), under given conditions such as atmospheric effects, distance, or characteristics of the viewing instrument. Only recently has it been suggested that clutter be an input variable in calculations of probability of detection. Our method for determining probability of detection uses a new definition of clutter and has a novel way of including clutter terms in P(t) determinations. Also, our method uses a new definition of the temperature differential between the target and background, so that our method is further distinguished from conventional methods.

Our method begins by acquiring and recording representations of -S a set of related infrared imaged scenes. The representations are pixelated and divided target blocks of pixels and background blocks of pixels. A plurality of $\Delta T$ metrics is used on the blocked representations to derive a plurality of $\Delta T$ values for each scenes. Then, by factor analysis, a relative $\Delta T$ value for each scene is derived from the plurality of $\Delta T$ values. The representations are also divided into cells of pixels in accordance with a plurality of clutter metrics whereupon these clutter metrics are used to derive a plurality of clutter values for each scene. Factor analysis is used to derive a relative clutter value for each scene. Then the relative $\Delta T$ and clutter values are used to find the probability of detection of the targets of interest in the scenes.

DETAILED DESCRIPTION

Figure 1:
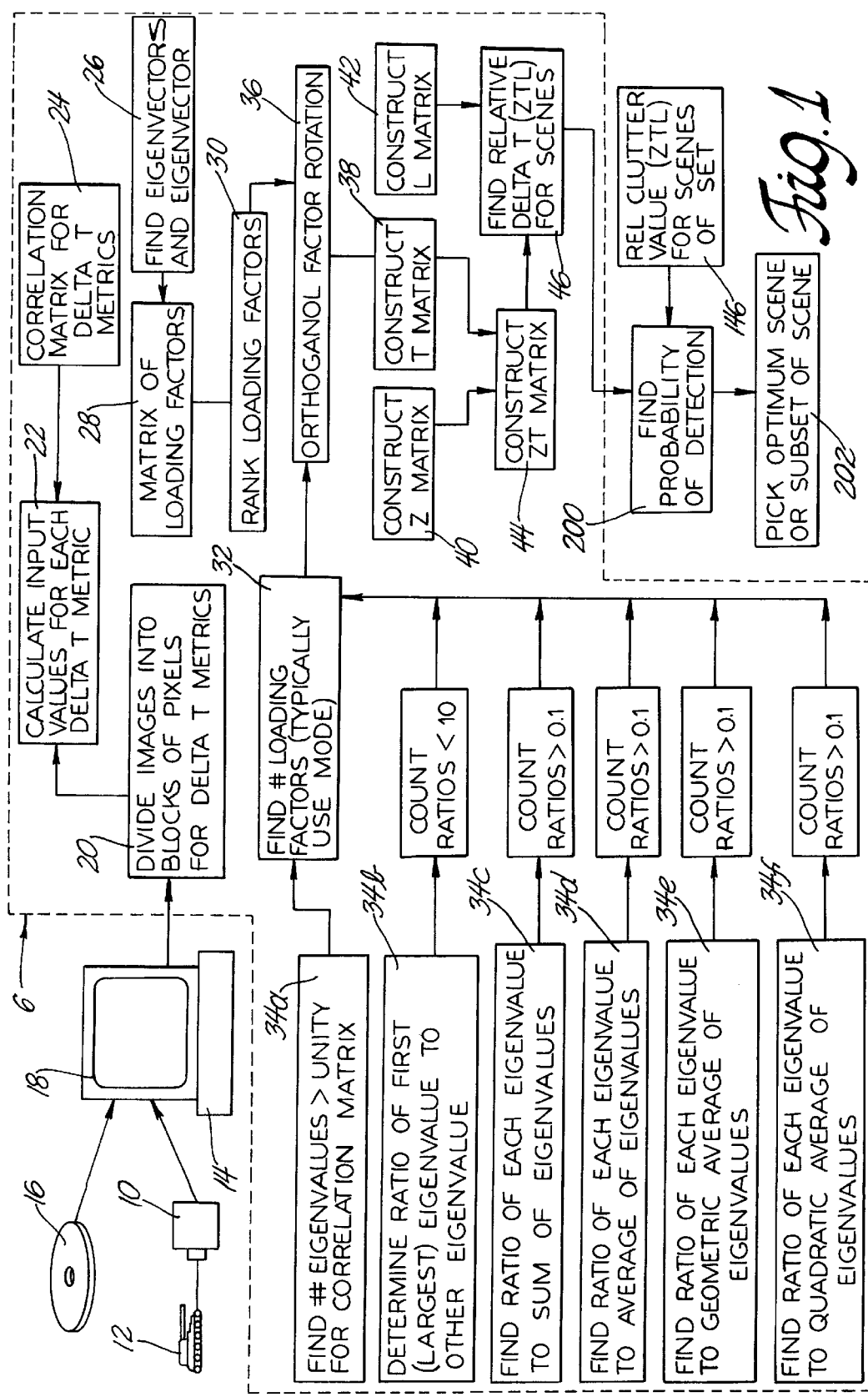
FIG. 1 is a flow chart showing the portion of our method where the relative temperature differential, $\Delta T$, is determined.
Figure 2:
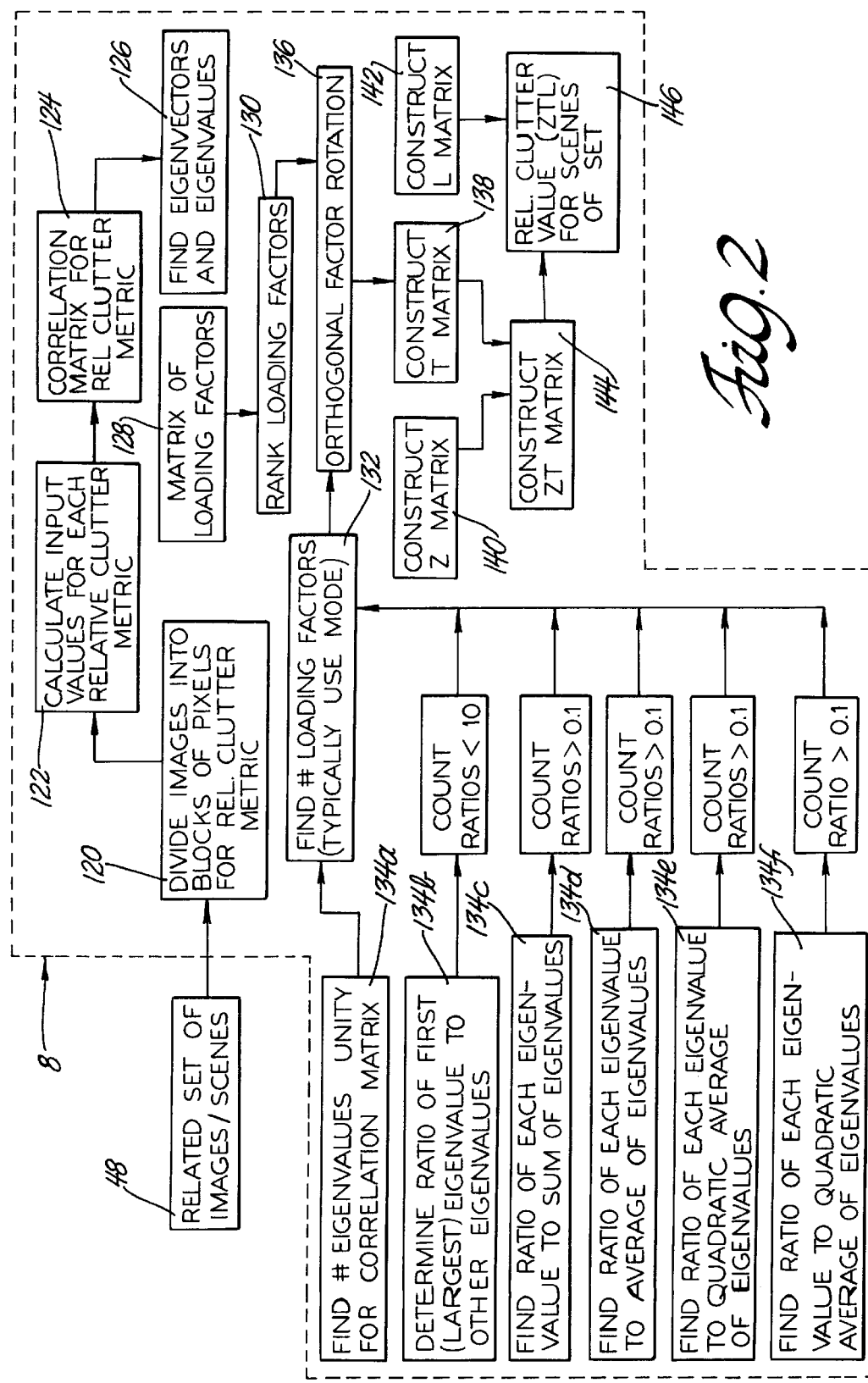
FIG. 2 is a flow chart showing the portion of our method wherein the relative clutter is determined.

The flow charts in FIGS. 1 and 2 are an outline of our method to determine the probability of detection of targets in given scenes. The first step in our method is the acquisition of a set of related infrared images or scenes. "Related scenes" are those that have a number of common variables and one or more of the common variables is differed from one scene to the next. A set of related scenes typically has a common distribution for variables such as ambient temperature, light intensity, direction of light rays, atmospheric conditions, distance from an observer to a target, target shape, target surface characteristics, target orientation, and background characteristics. In a set of, say 100 related infrared scenes, the target's surface characteristics, light intensity and target orientation or combinations of these variables can be graduatedly changed from one scene to the next while other conditions remain constant. We prefer to use a multiplicity of at least several to a dozen related scenes, although it is possible to use 2 scenes or even one scene. Acquisition of scenes would be done typically by directing infrared imaging device 10 at a target or object of interest 12 in the scene. Device 10 can be an instrument being tested for vision performance such as night vision goggles, a thermal gun sight or an infrared camera. Alternatively, previously acquired recordings of images or scenes may be retrieved from a memory device such as a floppy disk 16, computer hard drive or other medium. The scenes may be acquired by in-field photography, by imaging physical mock-ups of targets and backgrounds, by computer simulation, or by a combination of these techniques. The scenes are digitized into pixels, or pixelated, in conventional fashion and are placed in the memory of a computer 14, which is typically a PC. Optionally, the scene is presented on the monitor 18 communicated to computer 14.

Relative Temperature Differential, $\Delta T_{rel}$

In FIG. 1, the steps within subprocess 6 comprise the phase of our method wherein $\Delta T_{rel}$ values are found for the scenes. $\Delta T_{rel}$ is a derived measure of temperature differential between a target of interest within a scene and the background of the scene, the background being all of the scene that contains no portion of the target of interest. The pixels of the scene are grouped into sets of blocks or cells as denoted at step 20 in FIG. 1. One set of blocks is associated with a target of interest within the scene and another set of blocks is associated with the background of the scene. Next, values for $\Delta T$ are calculated, $\Delta T$ being the temperature differential between the background and the target. Numerous accepted formulas, or "metrics" exist for calculating $\Delta T$, each formula yielding a somewhat different value. Some of these formulas are listed below respectively as pixel average $\Delta T$, differential deviation $\Delta T$, RSS $\Delta T$, Doyle $\Delta T$, and area weighted average $\Delta T$.

$$\Delta T_{pixav} = \mu_t - \mu_b$$

$$\Delta T_{diff_{dev}} = \sigma_t - \sigma_b$$

$$T_{rss} = \sqrt{(\mu_t - \mu_b)^2 + \sigma_t^2}$$

-continued $$T_{doyle} = \sqrt{(\mu_t - \mu_b)^2 + (\sigma_t - \sigma_b)^2}$$

$$\Delta T_{awa} = \bar{T}_t - \bar{T}_b$$

In the above equations, $\mu_t$ is the average temperature at target pixels, $\mu_b$ is the average temperature at background pixels, $\sigma_t$ is the standard deviation of the target pixel temperatures, $\sigma_b$ is the standard deviation of the background pixel temperatures, bar $T_t$ is the weighted average temperature of the target and bar $T_b$ is the weighted average temperature of the background.

Another known formula for determining $\Delta T$ is the Moulton $\Delta T$, expressed as follows:

$$\Delta T_M = \left| \left( \sqrt{\frac{(R^2)(hfov)(vfov)}{N_{ip}}}(N_{pc}) \right)(\overline{PC} - \overline{T_b}) + \left( \sqrt{\frac{(R^2)(hfov)(vfov)}{N_{ip}}}(N_{lp}) \right)(\overline{LC} - \overline{T_b}) \right|$$

where R is range to the target, hfov is the horizontal field of view in milliradians, vfov is the vertical field of view in milliradians, $N_{ip}$ is the image size in pixels, PC is peak cluster value, $N_{pc}$ is the number of pixels in a peak cluster, LC is the low cluster value and $N_{lt}$ is the number of pixels in a low cluster.

A known, but relatively new formula for $\Delta T$ may optionally be used as well:

$$\Delta T_{new} =$$

$$\sigma_{ts} - \sigma_{bs} = \frac{\sqrt{N_s^2 + N_B^2(\sigma_T^2(\mu_T - \mu_s))^2} - \sqrt{N_s^2\sigma_B^2 + (N_T^2(\mu_B - \mu_T))^2}}{N_s}$$

where $\sigma_{ts}$ is the standard deviation of the target pixel temperatures conditioned on the mean temperature of the scene, $\sigma_{bs}$ is the standard deviation of the background pixel temperatures conditioned on the mean temperature of the scene, $N_s$ is the number of pixels of the overall scene, $N_B$ is the number of pixels of the background, $N_T$ is the number of pixels on the target, $\mu_T$ is the average temperature at target pixels, $\mu_B$ is the average temperature at background pixels, $\sigma_T$ is the standard deviation of the target pixel temperatures and $\sigma_B$ is the standard deviation of the background pixel temperatures. It is believed that the latter formula is more accurate than prior methods of calculating $\Delta T$. The latter formula considers the effects of temperature variations both among target pixels and among background pixels conditioned by the observer's field of view.

Still referring to FIG. 1, step 22 includes calculating pixel average $\Delta T$, differential deviation $\Delta T$, RSS $\Delta T$, Doyle $\Delta T$, area weighted average $\Delta T$ and Moulton $\Delta T$ for each of the related scenes. In the future, step 22 may preferably include the metric for calculation of $\Delta T_{new}$, once sufficient experience is gained with that metric.

Steps 24 through 42 generally follow a known "principle component" type of factor analysis commonly used for market survey analyses and software complexity valuations. Factor analysis can be done using any suitable commercially available software such as MiniTab™ software, which we used in developing our probability of detection technique. Though factor analysis techniques are well known, we believe that factor analysis has not before been applied to probability of detection techniques.

In step 24, a correlation matrix is generated based on the various $\Delta T$ values calculated for each of the related scenes in step 22. In step 26 eigenvalues and eigenvectors are calculated in conventional fashion. In step 28, a loading factor matrix is derived from the eigenvalues and eigenvectors of step 26 via the operation:

Next in the factor analysis is determining the relative $$\sqrt{\text{eigenvectors}} * \text{eigenvalues}$$

significance of the loading factors. To do this, the loading factors are ranked in step 30 according to their associated eigenvalues previously determined in step 26, a higher eigenvalue resulting in a higher rank. Then at step 32, a decision is made as to what number of loading factors are significant enough to include in further processing. That is, one decides how far down the list of ranked loading factors one will go before including no further loading factors. Although techniques exist to make such a decision, we depart from them and use a new decision technique described below.

Our decision technique has six substeps which are referenced in FIG. 1 by numerals 34a through 34f. Each substep is a different way to generate a proposed value for the number of loading factors. In substep 34a, the number of loading factors is determined by the number of eigenvalues from step 26 that are greater than unity.

In substep 34b, the eigenvalues of step 26 are arranged in ascending order of $\lambda_1\ \lambda_2\ \lambda_3\ \lambda_n$, where $\lambda_n$ is the nth eigenvalue. Then the following ratios are determined:

$$\frac{\lambda_1}{\lambda_2}, \frac{\lambda_1}{\lambda_3}, \frac{\lambda_1}{\lambda_3} \ldots \frac{\lambda_1}{\lambda_n}$$

The number of ratios that are less than 10 are counted and the result is another proposed value for the number of loading factors for substep 34b.

In substep 34c, the proposed number of factor loadings is determined by considering the ratio of each eigenvalue over the sum of the eigenvalues:

$$\frac{\lambda_1}{\sum \lambda_i}, \frac{\lambda_2}{\sum \lambda_i}, \frac{\lambda_3}{\sum \lambda_i} \ldots \frac{\lambda_n}{\sum \lambda_i}.$$

where "i" is the number of eigenvalues, $\Sigma_i$ is the sum of these eigenvalues and $\lambda_n$ is the nth of "i" eigenvalues. The number of ratios exceeding 0.1 is used as the proposed number of loading factors for substep 34c.

In substep 34d, the arithmetic average of the eigenvalues is determined and then each eigenvalue is then divided by this average. The number of resulting quotients greater than 0.1 is used as the proposed number of loading factors for substep 34d.

In substep 34e, each eigenvalue is divided by the geometric average of the eigenvalues, according to the form $$\frac{\lambda_i}{\left[ \frac{\lambda_1^2 + \lambda_2^2 + \lambda_3^2 + \ldots \lambda_n^2}{n} \right]^{1/2}}$$

The number of quotients resulting from division by the geometric average is the proposed number of loading factors for substep 34e.

In substep 34f, each eigenvalue is divided by the quadratic average of the eigenvalues, according to the form $$\frac{\lambda_i}{\sqrt[n]{(\lambda_1)(\lambda_2)(\lambda_3)\dots(\lambda_n)}}$$

The number of quotients resulting from division by the quadratic average is then the proposed number of loading factors for substep 34f.

The substeps create a total of six proposed numbers of loading factors, and we choose the mode of the six proposed numbers as the number of loading factors to be used. Choosing the number of loading factors is depicted as step 32 in FIG. 1. We then pick the highest ranking loading factor, and then the second highest ranking loading factor, and so on, until we have a number of loading factors equal to the above mode.

In step 36, the chosen factor loadings are placed in a matrix, $F_r$, and are then orthogonally rotated, preferably by a Varimax version of orthogonal rotation. It is then possible in step 38 to obtain a transformation matrix, T, which contains ratios of the chosen pre-rotation loading factors to their post-rotation counterparts. T can be expressed by:

$$T = R^{-1} i F_r$$

where $R^{-1}$ is a matrix of the inverses of the chosen pre-rotation loading factors.

Next, in step 40, is the conventional construction of a Z matrix containing normalized input data, the input data being original ΔT values for each metric for each scene. In factor analysis parlance, this operation is described as converting raw data vectors to standard score vectors. For example, conversion of pixel average ΔT raw data vector to the standard score vector would proceed thus:
where $Z_{pixav,1}$ is the normalized pixel average ΔT value for the "i"th $$Z_{pixav,i} = \frac{\Delta T_{pixav,i} - \overline{\Delta T_{pixav}}}{\sigma_{pixav}}$$

scene, $\Delta T_{pixav,i}$ is the raw $\Delta T_{pixac}$ value for the "i"th scene, bar $\Delta T_{pixav}$ is the average of the raw $\Delta T_{pixav}$ values, and $\sigma_{pixav}$ is the standard deviation of the raw $\Delta T_{pixav}$ values. Similar conversions can be made as needed for RSS ΔT, Doyle ΔT, and area weighted average ΔT and Moulton ΔT or any other ΔT metric associated with rotated loading factors.

Next, in step 44, matrix T is used to map the standardized ΔT values of matrix Z onto the identified orthogonal dimensions (in this case, temperature differential dimensions) arrayed in an L matrix. The L matrix, created in step 42, is defined as the variance of the rotated factor loading matrix, $F_r$; and the L matrix is populated by eigenvalues of $F_r$. The foregoing matrix operations result in a matrix product $ZTL^T$ ($L^T$ being the transform of L) from which is computed in step 46 a "composite" or relative ΔT, denoted $T_{rel}$:

$$\Delta T_{rel} = ZTL^T$$

Relative Clutter, $C_{rel}$

In FIG. 2, the steps within subprocess 8 comprise the phase of our method wherein $C_{rel}$ values are found for the scenes. $C_{rel}$, or relative clutter, is a composite of two or more metrics for clutter. The first step in determining relative clutter is to divide into cells or blocks the already-acquired set of related scenes 48 residing in computer 14 (FIG. 1). The dividing is done at step 122 in FIG. 2, which is a counterpart to step 22 in FIG. 1. The blocks of subprocess 8 are different from, and are in addition to, the previously mentioned blocks of subprocess 6. Subprocess 8 can, and typically does, simultaneously use multiple types of block divisions, the type of block divisions depending on the clutter metrics used for subprocess 8. Typical block divisions are mentioned in the descriptions below of some more widely used conventional clutter metrics.

The Der clutter metric was originally used to predict the false alarm rates for a given algorithm. In this metric, a double window is convolved one pixel at a time over a scene, the inner window being the size of the largest target in the scene. At each pixel location, the Der metric decides whether the new pixel is in the same intensity space as the pixel previously examined and whether the new pixel fits into the inner window. When an intense region of the scene of approximate target size is found, that region is cataloged. The original Der metric finds a false alarm rate by multiplying the distribution of target-like areas by the probability-of-detection distribution. A later use of the Der metric is to simply count the Der objects in a scene to find the number of target-like objects in a scene as a measure of clutter.

The probability of edge (POE) metric is meant to determine the relation between the human visual detection system and the statistics of color or black-and-white images. The image is divided into blocks twice the apparent size of the target in each dimension. Then each block is processed with a difference-of-offset-Gaussian (DOOG), thereby emulating one of the preattentive channels in human vision so as to enhance target edges. The histogram of the processed image is normalized and a threshold is chosen based on the histogram. The number of points that exceed the threshold in the "i"th block is defined as $POE_{i,T}$ and the POE metric is computed thus:

$$POE = \frac{1}{N} \sum_{i=1}^{N} POE_{i,T}^2$$

The Schmeider-Weathersby (SW) metric uses the root-mean-square of the spatial-intensity properties of the background of a scene. Presently, the SW metric is the most commonly used clutter measure. The SW metric is computed by averaging the variance among contiguous square cells over the whole scene:

$$clutter = \sqrt{\frac{1}{N} \sum_{i=1}^{N} \sigma_i^2}$$

where $\sigma^2$ is the variance in intensity of pixels in the "i"th cell it and N is the number of blocks or cells into which the scene has been divided. Typically N is defined to be twice the length in pixels of the largest target dimension.

A variant of the SW metric replaces $U\sigma^2$ in the above equation with a gray scale texture value for each cell. The gray scale texture was found by a formula published by W. K. Pratt in *Digital Image Processing*, John Wiley and Sons, New York, 1978, page 508: where a and b are any two gray-scale values, at any pixel (j,k) in $$T(j, k, r, \theta) = \sum_{a=0}^{L-1} \sum_{b=0}^{L-1} P(a, b; j, k, r, \theta)$$

the scene, r is step size, and θ is step direction (θ=0 means stepping horizontally). P is the fraction of the total of steps whose end points are the respective gray-scale values a and b. The total number of steps is L−1. The mean texture is then defined as:

$$M_T(j,k,r) = \frac{1}{N_\theta} \sum_\theta T(j,k,\theta)$$

where $N_{74}$ is the number of step in direction $\theta$ and $\Sigma_\theta T(j,k,r,\theta)$ is the sum of textures found in the preceding equation in direction $\theta$. Horizontal and vertical texture are found for each scene. The modified SW metric then becomes:

$$\text{clutter} = \sqrt{\sum_{i=1}^{N} \left(\frac{1}{N_\theta}\right) \frac{\left(\sum_\theta T_i(j,k,r,\theta)\right)}{N}}$$

Thus far in our technique to determine probability of detection, we have preferred to use only the Der clutter metric and the unmodified SW metric, simply because empirical experimental data was available to verify the results of these metrics. As more empirical experimental data becomes available on other clutter metrics, we will most probably prefer to include these other clutter metrics in our technique.

Once each clutter metric has been calculated in step 122 for each scene in the related set of scenes 48, a factor analysis is performed in steps 124 through 146 (FIG. 2) that is analogous to the factor analysis in steps 24 through 46 (FIG. 1). In step 124, a correlation matrix for the clutter metrics is formed and then at step 126 eigenvectors and eigenvalues are generated from the step 124 correlation matrix. In step 128, a factor loading matrix is derived from the step 126 eigenvalues and eigenvectors, again via the operation:

$$\sqrt{eigenvectors} * eigenvalues$$

The loading factors are ranked in step 130 in order of their eigenvalues and then in step 132 the number of loading factors to be used for subsequent orthogonal rotation is determined. Note that substeps 134a through 134f and step 132 are essentially the same as substeps 34a through 34f and step 32; the only difference is that substeps 134a through 134f and step 132 relate to factor analysis of clutter metrics instead of $\Delta T$ metrics. After orthogonal factor rotation (step 136), the T, Z. L and ZT matrices are generated in respective steps 138, 140, 142 and 144 in the same fashion as done in subprocess 6 in FIG. 1. Then a relative clutter value is calculated from the matrix product $ZTL^T$, again similarly to the manner of subprocess 6.

Probability of Detection

Within the science of infrared target acquisition modelling, it is known that:

$$SNR = \frac{\Delta T\tau}{\text{noise} + \text{clutter}} = \frac{\Delta T\tau}{MRT/(\varepsilon/7)^{1/2}}$$

where SNR is signal-to-noise ratio of the electro-optical system being used for imaging, $\tau$ is atmospheric transmittance, $\Delta T$ is the temperature differential between the target and background, MRT is the minimum resolvable temperature of the electro-optical system. In infrared target acquisition, MRT is termed "spatial frequency" and is expressed in cycles/milliradians. A cycle is a pair of adjacent lines of pixels and milliradians are the angular units of measure of a target dimension as viewed by the electrical-optical system. Noise is defined as gaussian static of that system and clutter has the same definition as previously discussed. From the foregoing equation, one concludes that:

$$\text{noise} + \text{clutter} = MRT/(\Sigma/7)^{1/2}$$

Within the science of infrared target acquisition modelling it is also known that:

$$MRT = MRT_0 \eta^{\beta_{sys}\nu}$$

where $MRT_0$ is the value MRT approaches zero and $\beta_{sys}$ the electrical-optical systems's extinction coefficient. Consequently, $$\text{noise} + \text{clutter} = (MRT_0) \frac{e^{\beta_{sys}\nu}}{(\varepsilon/7)^{1/2}}$$

which implies:

$$MRT_0 = (\varepsilon/7) e^{\frac{1}{\beta_{sys}\nu}} (\text{noise} + \text{clutter})$$

As will be shown later, we substitute the definition of $MRT_0$ immediately above into an existing equation for probability of detection as a function of time, P(t). Since the above definition of $MRT_0$ has terms for clutter and $\Delta T$, the terms for clutter and $\Delta T$ are then necessarily incorporated into the P(t) function. We believe that this particular manner of incorporating clutter and $\Delta T$ is unique. Also unique is our use of the above-derived relative clutter and relative $\Delta T$ as the clutter and $\Delta T$ in the P(t) function.

The existing equation we use for probability of detection is:

$$P(t) = \frac{\rho}{CF}\left[1 - e^{\left(\frac{\rho/CF)t}{3.4}\right)}\right]$$

where $\rho$ is an estimate of target acquisition probability over an infinite amount of time, t is the time an observer spends searching a fixed field of view and CF is a clutter factor. In our technique, we use relative clutter for the value for CF, whereby relative clutter appears twice as a term in the P(t) function as we use it: relative clutter appears a first time because it is a component of $MRT_0$ and appears a second time when relative clutter is used for CF. Now, $\rho$ is further defined as $$\rho = \frac{(n/n_{50})^E}{1 + (n/n_{50})^E}$$

where n=the number of resolvable cycles across the target, $n_{50}$ is the number of cycles needed to make $\rho/CF$ equal to 0.5, E is equal to 2.7+0.7 $(n/n_{50})$ and $n/n_{50}$ is defined thus: Next, substituting the previous definition of $MRT_0$ into the above $$\left[\frac{n}{n_{50}}\right] = \frac{\ln\left[\frac{\Delta T\sqrt{\varepsilon/7}}{MRT_0} - R\beta_{sys}\right]}{\frac{\gamma}{s}\beta_{sys}R}$$

Next, substituting the previous definition of $MRT_0$ into the above equation, one obtains $$\frac{n}{n_{50}} = \frac{\ln\left(\frac{\Delta T\sqrt{\varepsilon/7}}{[(\varepsilon/7)(noise + clutter)]^{1/\beta_{sys}}} - R\beta_{sys}\right)}{\frac{\gamma}{s}\beta_{sys}R}$$

The right side of the above equation, which has terms for clutter and $\Delta T$, is substituted for $n/n_{50}$ in the previous definition of $\rho$. The resulting new definition of $\rho$ is then substituted in the aforementioned extant equation for P (t), whereby a new formula for P(t) is created.

Referring now to FIG. 1, in step 200 the probability of detection is calculated for each scene in the related set of scenes. Step 200 utilizes the relative $\Delta T$ and the relative clutter values from steps 46 and 146 respectively. The next step, 202, is simply to pick the best scene or the best identifiable subset of scenes from the set. For example, the tested variable could be vehicle surface coatings or paint variations. Each coating or paint variation under consideration can be subjected to the same distribution of other variables such as vehicle shape, light intensity, background and so forth. The best subset of scenes associated with a given coating or paint variation can be picked. Of course, the "tested variable" can be a combination of conditions such as metal from which the vehicle is made and modifications to the target's shape.

Figure 3:
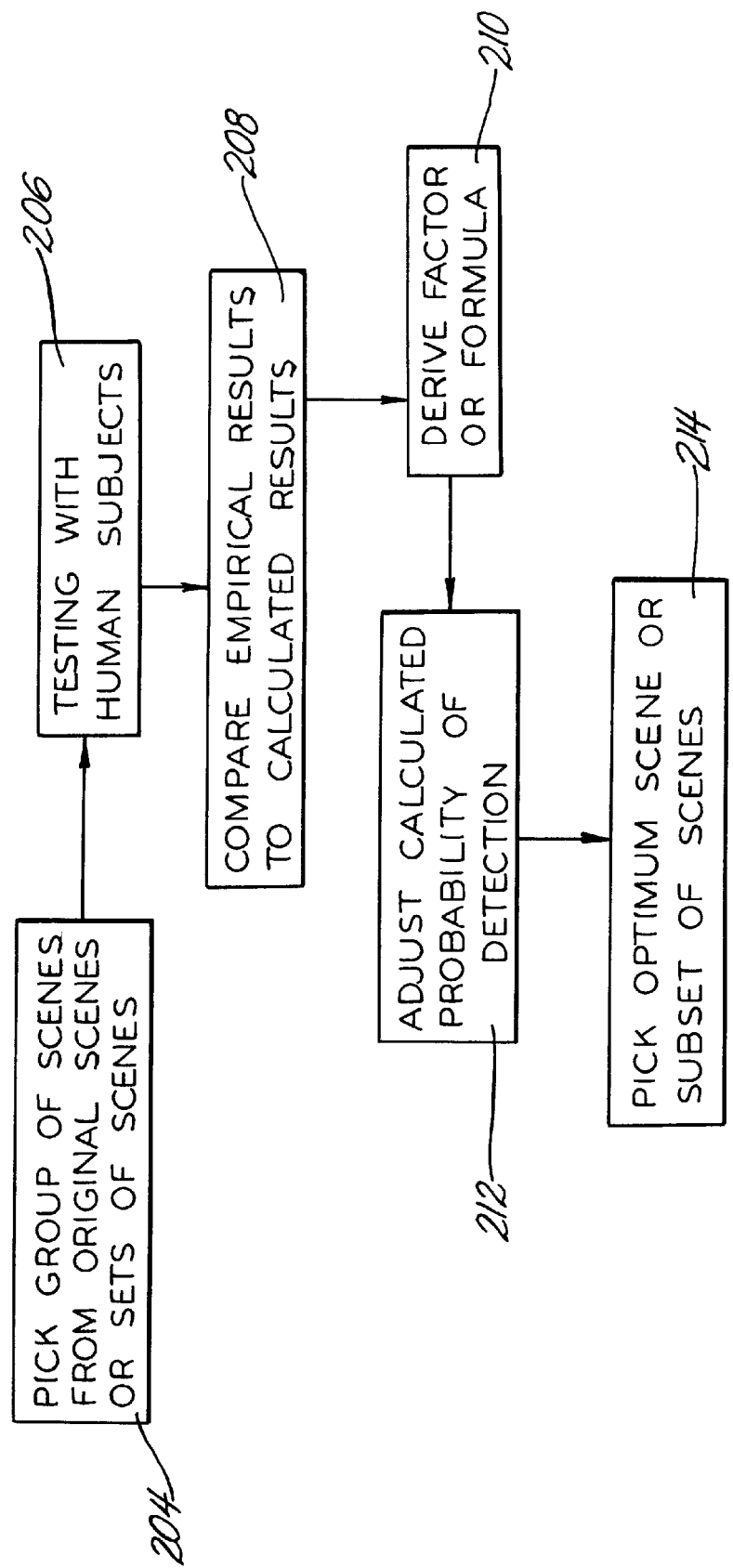
FIG. 3 is a flow chart showing an optional added subprocess for our method.

FIG. 3 is shows optional steps that may be incorporated into our technique to find probability of detection, P(t). Step 204 comprises selecting some representative group of the scenes in the related set(s) for which P(t) has already been found according the method described in conjunction with FIGS. 1 and 2. Then in step 206, the selected scenes are subjected to empirical testing for probability of detection with human subjects in accordance with established testing protocols. Of course, steps 204 and 206 can involve all the scenes in the related set(s) for which P(t) has already been found, but doing so may be burdensome because of the man-hours needed. Step 208 is the comparison of the calculated P(t) to the probability of detection found through the step 206 empirical testing. Step 210 is an attempt to derive a pattern, factor or formula that accurately predicts or explains any variance between calculated P(t) and empirically found probability of detection. If such a pattern, factor or formula can be found, then the P(t) values are adjusted accordingly (step 212) and there is a repicking of the optimum scene or subset of scenes (step 214).

Steps 204 through 214 provide a verification of the P(t) values calculated at step 200. Additionally, these steps can build a data base in cases where the step 200 P(t) involves the use of $\Delta T$ or relative clutter metrics for which large amounts empirical test data are not yet available. Additionally, these steps provide an opportunity to gain insights for improving $\Delta T$, clutter or other metrics used in computing the probability of detection of a vehicle.

We wish it to be understood that we do not desire to be limited to the exact details shown herein since obvious modifications will occur to those skilled in the relevant arts without departing from the spirit and scope of the following claims.

What is claimed is:

1. A method to determine the probability of detection of a target of interest, comprising the steps of:
   (a) acquiring a set of imaged scenes containing the target, the acquiring step consisting either of directing an infrared imaging device at the scenes or graphically constructing the scenes, the acquiring step including making representations of the scenes;
   (b) pixelating the representations of any of the scenes not pixelated during the acquiring step;
   (c) recording the representations in a memory;
   (d) dividing the representations into target blocks of pixels and background blocks of pixels;
   (e) after dividing the representations into the blocks, using a plurality of $\Delta T$ metrics to derive a plurality of $\Delta T$ values for the scenes;
   (f) deriving relative $\Delta T$ values from the plurality of $\Delta T$ values;
   (g) dividing the representations into cells of pixels in accordance with a plurality of clutter metrics;
   (h) after dividing the representations into cells, use the plurality of clutter metrics to derive a plurality of clutter values for the scenes;
   (i) deriving relative clutter values for the scenes;
   (j) using the relative $\Delta T$ values and the relative clutter values in determining the probability of detection of the targets of interest in the scenes; and
   (k) based on the probabilities of detection choosing the optimum scene or set of scenes.

2. The method of claim 1 wherein deriving relative $\Delta T$ values and deriving relative clutter are done by a factor analysis which includes choosing a number of loading factors to be rotated the factor analysis and wherein choosing the number of the loading factors comprises:

forming a correlation matrix for the $\Delta T$ values;
   determining the eigenvalues of the correlation matrix;
   generating a first proposed number of loading factors by counting the number of the eigenvalues that are greater than unity;
   generating a second proposed number of loading factors by arranging the eigenvalues in ascending order of $\lambda_1$ $\lambda_2$ $\lambda_3$ $\lambda_n$ where $\lambda_n$ is the nth eigenvalue and then evaluating first ratios $$\frac{\lambda_1}{\lambda_2}, \frac{\lambda_1}{\lambda_3}, \frac{\lambda_1}{\lambda_3} \ldots \frac{\lambda_1}{\lambda_n}$$

and then counting the first ratios that are less than 10;
   generating a third proposed number of loading factors by evaluating second ratios $$\frac{\lambda_1}{\Sigma\lambda_i}, \frac{\lambda_2}{\Sigma\lambda_i}, \frac{\lambda_3}{\Sigma\lambda_i} \ldots \frac{\lambda_n}{\Sigma\lambda_i}.$$

where "i" is a number of eigenvalues, $\Sigma_i$ is a sum of these eigenvalues and $\lambda_n$ is the nth of "i" eigenvalues, and then counting the second ratios exceeding 0.1;
   generating a fourth proposed number of loading factors by finding an arithmetic average of the eigenvalues, and then dividing the eigenvalues by the arithmetic average, and then counting resultant arithmetic-average quotients greater than 0.1;
   generating a fifth proposed number of loading factors by dividing the eigenvalues by a geometric average of the eigenvalues, and counting resultant geometric-average quotients;

generating a sixth proposed number of loading factors by dividing the eigenvalues by a quadratic average of the eigenvalues, and counting resultant quadratic-average quotients;

using the proposed numbers to derive an actual number of loading factors.

3. The method of claim 1 wherein a probability of detection formula is used which has the form $$P(t) = \frac{\rho}{CF}\left[1 - e^{\left(\frac{-(\rho/CF)t}{3.4}\right)}\right]$$

and $\rho$ is defined by $$\rho = \frac{(n/n_{50})^E}{1 + (n/n_{50})^E}$$

and n=the number of resolvable cycles across the target, $n_{50}$ is the number of cycles needed to make $\rho/CF$ equal to 0.5, E is equal to 2.7+0.7 $(n/n_{50})$ and $n/n_{50}$ is defined by $$\left[\frac{n}{n_{50}}\right] = \frac{\ln\left[\frac{\Delta T\sqrt{\varepsilon/7}}{MRT_0} - R\beta_{sys}\right]}{\frac{\gamma}{s}\beta_{sys}R};$$

and $$\frac{n}{n_{50}} = \frac{\ln\left(\frac{\Delta T\sqrt{\varepsilon/7}}{[(\varepsilon/7)(noise + clutter)]^{1/\beta_{sys}}} - R\beta_{sys}\right)}{\frac{\gamma}{s}\beta_{sys}R}$$

and wherein relative $\Delta T$ is $\Delta T$ and relative clutter is used for the terms CF and clutter.

4. The method of claim 1 wherein one of the $\Delta T$ metrics is the $\Delta T_{new}$ metric.

5. The method of claim 1 wherein the probabilities of detection are first probabilities of detection, the method further including:
 selecting a group of the scenes;
 presenting the scenes in a form visually perceptible by human subjects;
 using the human subjects to empirically find second probabilities of detection for group of scenes;
 making a comparison of the first probabilities of detection to the second probabilities of detection.

6. The method of claim 1 wherein steps (d) through (j) are performed on a computer.

7. A method to determine the probability of detection of targets of interest, comprising the steps of:
 (a) acquiring a multiplicity of related imaged scenes containing the target, the acquiring step consisting either of directing an infrared imaging device at the scenes or graphically constructing the scenes, the acquiring step including making representations of the scenes;

(b) pixelating the representations of any of the scenes not pixelated as part of the acquiring step;

(c) recording the representations in a computer memory;

(d) dividing the representations into target blocks of pixels and background blocks of pixels;

(e) after dividing the representations into the blocks, use a plurality of $\Delta T$ metrics to derive a plurality of $\Delta T$ values for the scenes;

(f) using factor analysis for deriving relative $\Delta T$ values from the plurality of $\Delta T$ values;

(g) dividing the representations into cells of pixels in. accordance with a plurality of clutter metrics;

(h) after dividing the representations into cells, use the plurality of clutter metrics to derive a plurality of clutter values for the scenes;

(i) using factor analysis for deriving relative clutter values for the scenes;

(j) using the relative $\Delta T$ values and the relative clutter values in determining the probability of detection of the target; of interest in the scenes; and (k) based on the probabilities of detection choosing the optimum scene or set of scenes.

8. The method of claim 7 wherein the probability of detection is derived by a formula which has the form and $\rho$ is defined by $$P(t) = \frac{\rho}{CF}\left[1 - e^{\left(\frac{-(\rho/CF)t}{3.4}\right)}\right]$$

$$\rho = \frac{(n/n_{50})^E}{1 + (n/n_{50})^E}$$

and n=the number of resolvable cycles across the target, $n_{50}$ is the number of cycles needed to make $\rho/CF$ equal to 0.5, E is equal to 2.7+0.7 $(n/n_{50})$ and $n/n_{50}$ is defined by $$\left[\frac{n}{n_{50}}\right] = \frac{\ln\left[\frac{\Delta T\sqrt{\varepsilon/7}}{MRT_0} - R\beta_{sys}\right]}{\frac{\gamma}{s}\beta_{sys}R};$$

and $$\frac{n}{n_{50}} = \frac{\ln\left(\frac{\Delta T\sqrt{\varepsilon/7}}{[(\varepsilon/7)(noise + clutter)]^{1/\beta_{sys}}} - R\beta_{sys}\right)}{\frac{\gamma}{s}\beta_{sys}R}$$

and wherein relative $\Delta T$ is $\Delta T$ and relative clutter is used for the terms CF and clutter.

9. The method of claim 7 wherein steps (d) through (j) are performed on a computer.

* * * * *